US011168976B2

(12) United States Patent
Amthor et al.

(10) Patent No.: US 11,168,976 B2
(45) Date of Patent: Nov. 9, 2021

(54) MEASURING DEVICE FOR EXAMINING A SPECIMEN AND METHOD FOR DETERMINING A TOPOGRAPHIC MAP OF A SPECIMEN

(71) Applicant: Carl Zeiss Microscopy GmbH, Jena (DE)

(72) Inventors: Manuel Amthor, Jena (DE); Daniel Haase, Zöllnitz (DE); Dominik Stehr, Jena (DE)

(73) Assignee: Carl Zeiss Microscopy GMBH, Jena (DE)

( * ) Notice: Subject to any disclaimer, the term of this patent is extended or adjusted under 35 U.S.C. 154(b) by 0 days.

(21) Appl. No.: 16/951,612

(22) Filed: Nov. 18, 2020

(65) Prior Publication Data

US 2021/0156669 A1    May 27, 2021

(30) Foreign Application Priority Data

Nov. 22, 2019  (DE) .......................... 102019131693.6

(51) Int. Cl.
  *G06K 9/00*  (2006.01)
  *G01B 11/06*  (2006.01)
  *G06T 7/62*  (2017.01)
  *G06K 9/32*  (2006.01)

(52) U.S. Cl.
  CPC ........ *G01B 11/0608* (2013.01); *G06K 9/3233* (2013.01); *G06T 7/62* (2017.01)

(58) Field of Classification Search
  CPC ...... G01B 11/0608; G06T 7/62; G06K 9/3233
  See application file for complete search history.

(56) References Cited

U.S. PATENT DOCUMENTS

| 2005/0173633 A1* | 8/2005 | Tanaka ............... G01N 23/2251 250/311 |
| 2015/0130927 A1 | 5/2015 | Luxen et al. |
| 2017/0166862 A1* | 6/2017 | Shen .................... C12N 5/0068 |
| 2019/0307409 A1* | 10/2019 | Zheng .................. A61B 8/5238 |
| 2020/0149872 A1* | 5/2020 | Fujiwara ............. G02B 26/105 |

FOREIGN PATENT DOCUMENTS

| DE | 102012104282 A1 | 11/2013 |
| DE | 102017116758 A1 | 1/2018 |
| EP | 3441773 A1 | 2/2019 |

OTHER PUBLICATIONS

Stade, Jonas, Search Report for DE102019131693.6, dated Sep. 16, 2020, with English translation (9 pages).
Stade, Jonas, Search Report for DE102019131693.6, dated Sep. 16, 2020, 5 pages (English translation not available).

* cited by examiner

*Primary Examiner* — Tom Y Lu
(74) *Attorney, Agent, or Firm* — LaBatt, LLC (57) ABSTRACT

A method for determining a height map of a sample includes the following steps: receiving height measurement data of the sample; receiving an overview image of the sample; identifying certain image regions in the overview image; deriving context information in relation to identified image regions; and supplementing or altering the height measurement data with the aid of the context information. Moreover, a measuring apparatus configured to carry out the method is described.

20 Claims, 4 Drawing Sheets

MEASURING DEVICE FOR EXAMINING A SPECIMEN AND METHOD FOR DETERMINING A TOPOGRAPHIC MAP OF A SPECIMEN

REFERENCE TO RELATED APPLICATIONS

The current application claims the benefit of German Patent Application No. 10 2019 131 693.6, filed on 22 Nov. 2019, which is hereby incorporated by reference.

FIELD OF THE DISCLOSURE

The present disclosure relates to a measuring device/apparatus for examining a sample or specimen, and a method for determining a height map/topographic map of a sample.

BACKGROUND OF THE DISCLOSURE

A generic measuring apparatus for examining a sample, for example a microscope or a coordinate measuring machine, comprises an examination device for examining the sample. The examination device can comprise an objective or a tactile measuring head, in particular. Moreover, a generic measuring apparatus comprises an overview device which is configured to record raw height measurement data of the sample and generate an overview image of the sample. A computing device of the measuring apparatus is configured to calculate height measurement data from the raw height measurement data.

A generic method for determining a height map of a sample includes at least the following steps: receiving height measurement data of the sample and receiving an overview image of the sample.

A comparatively small distance between the sample and the examination device is often needed in order to precisely examine a sample. By way of example, the sample should often only have a distance of a few millimetres from an objective of the examination device. Especially if the sample has a height structure, certain knowledge about this height structure is useful to prevent a collision between a component of the examination device and the sample. Height measurement data and/or an overview image are obtained in advance, in particular for this purpose. The height measurement data and/or the overview image can be used to set a relative position between the sample and the examination device. Therefore, a general objective consists of being able to obtain height measurement data that are as precise as possible and/or an overview image of the sample that is as precise as possible using the overview device.

However, samples to be examined can have regions which frequently lead to erroneous height measurement data or a lack of height measurement data in the case of typical measurement techniques. This can be the case, in particular, in the case of mirroring or transparent regions, where measurement light is not reflected in the way required for the measurement principle. If a sample region is covered by other objects, height measurement data are missing or perhaps the height measurement data of the adjacent object are incorrectly captured for this sample region. There is a danger of overlooking sample regions with a small extent. Erroneous height measurement data may also arise in sample regions with little contrast or structure.

Conventionally, users must therefore regularly rework an ascertained height map manually by means of editing software, for example by deleting non-relevant data or by filling non-measured sample points by interpolation.

Known techniques either require complex manual activity on the part of the user or supply improvable results in the case of automatically corrected height maps.

What also emerges herefrom is that a global safety margin is frequently enforced for the purposes of avoiding a collision between the examination device and the sample. In this case, the examination device (e.g., an objective) must always observe the safety margin. An automatically adjustable sample stage must not drive the sample closer to the objective than the safety margin. In part, this leads to unsatisfactory results in the use or in view of resolution and contrast.

An object of the invention can be considered that of specifying a measuring apparatus and a method which are able to generate a height map with the highest possible quality.

SUMMARY OF THE DISCLOSURE

This object is achieved by means of the measuring apparatus defined in claim 1 and by means of the method defined in claim 2.

Advantageous variants of the measuring apparatus according to the invention and of the method according to the invention are subjects of the dependent claims and will additionally be explained in the description that follows.

In the case of the measuring apparatus of the aforementioned type, the computing device, according to the invention, is configured to:
- identify certain image regions in the overview image;
- derive context information in relation to identified image regions; and
- supplement or alter the height measurement data with the aid of the context information.

At least the following steps are provided according to the invention in the method of the aforementioned type:
- identifying certain image regions in the overview image;
- deriving context information in relation to identified image regions; and
- supplementing or altering the height measurement data with the aid of the context information.

Subsequently, a height map of the sample can be formed with the supplemented or altered height measurement data.

Accordingly, certain objects or object types can be identified as such in an overview image using the invention. Context information, which relates to the height of the identified image regions, is ascertained from knowledge of the objects or object type. Then, a height measurement map or the height measurement data for generating a height measurement map can be corrected or supplemented with the aid of this information obtained from the overview image. By way of example, a certain image region can be identified as a shadow or a mirroring object part, for which no height measurement data or no plausible height measurement data were obtained. Now, height measurement data for the shadow or mirroring image region are not simply supplemented by virtue of the height measurement values for all adjacent image parts being interpolated. Rather, the context information can specify object boundaries, for example, such that only height measurement values of adjacent image parts which also belong to the same object are used in the case of mirroring for the purposes of supplementing height values by interpolation. By contrast, height measurement values of other adjacent image parts, which are located outside of the object boundary with the mirroring, are not used for the interpolation of height measurement values. When identifying a shadow, it is also easily understandable that the context information can specify where a shadow-casting object is and where there is a substrate on which said shadow is cast. As a result, should there be an interpolation of height measurement values of certain adjacent image parts, the context information can specify the adjacent image parts from which the height measurement values are used to fill height values of the image region of the shadow. The identification of shadows and mirroring was described to ease understanding of the invention and only represents an optional invention variant.

By way of example, obtaining height measurement data of the sample can include receiving height measurement data from an overview device or else loading height measurement data, which were recorded at an earlier point, from a memory. Moreover, obtaining height measurement data can include receiving height measurement data from a computing device, which calculates the height measurement data from measured raw data. Height measurement data can also be referred to as height profile measurement data or 3D reconstruction data.

Optionally, the method according to the invention also includes the recording of raw height measurement data using an overview device. In principle, the overview device can be designed in any way for recording tactile raw measurement data or optical raw measurement data for a contactless capture of the topography of a sample.

In particular, the overview device can comprise one or more cameras or camera chips. Then, the height measurement data are obtained from the raw measurement data of the camera(s). One or more cameras may be preferred, depending on the measurement principle. In particular, a single camera suffices for a pattern projection, within the scope of which, for example, light stripes or light point patterns are guided onto the sample, for example according to a SLAM (simultaneous localization and mapping) method. If images are recorded by a plurality of cameras directed on the sample from different observation angles, height measurement values can be obtained from differences between these images without special lighting being required. In principle, a detector or a camera of the overview device can also be identical to a detector/a camera of the examination device. In this case, remaining components of the overview and examination device differ, as a result of which a lateral measurement region of the detector/the camera is larger when used as an overview device than a lateral measurement region of the detector/the camera when used as an examination device. Particularly in the case of a microscope, different objectives can be used to this end, wherein the examination device uses an objective with a greater imaging scale than the overview device.

By way of example, the measuring apparatus can be a coordinate measuring machine or a microscope, for example an electron or ion microscope or a light microscope, wherein, in principle, any spectral range from infrared light to UV light or else to x-rays comes into consideration for illumination purposes. The invention is not restricted to specific fields of use and, as a result, the sample can be any object in principle. By way of example, the invention can be used in measurement inspection, in manufacturing monitoring or in the examination of microscopic samples, in particular in the life sciences or in chip testing. In the case of a metrology system which is intended to be used to ascertain a shape and/or relative position of a workpiece to be examined, the determination of a height map according to the invention by means of the overview device allows a faster capture and hence a greatly reduced throughput time.

To capture raw height measurement data, use can be made, inter alia, of an optical triangulation line sensor or a chromatic white light sensor or a confocal (white light) sensor, in which foci of different light wavelengths are generated at different heights as a result of a chromatic longitudinal aberration. Laser triangulation, interferometry and a focus variation in the height direction are also possible. Depending on the measurement principle, no illumination light source is required for recording the raw height measurement data and/or the overview image. Use can also be made of stereo or multi-camera systems, in which height measurement data are derivable from differences in the plurality of recorded images. The cameras can observe the sample from different angles and/or supply various raw height measurement data by way of different focal lengths. Combinations of the aforementioned options can also be used as an overview device.

The examination device can operate in optical or tactile fashion and, for example, be formed by a coordinate measuring machine. The latter can comprise a tactile roughness sensor or a differential transformer, in which a path measurement is implemented with the aid of a linear variable differential transformer (LVDT).

Optionally, the overview image can be formed or calculated from or with the aid of the height measurement data or raw height measurement data. The overview image and the height measurement data can therefore be recorded, at least in part, by way of the same measuring device. Alternatively, measuring devices that are separated from one another (and referred to together as an overview device) can record the raw height measurement data and the overview image. Hence, the overview image can be recorded using an overview camera, which is present in addition to a camera for recording the raw height measurement data, or, alternatively, this overview camera can also serve to record raw height measurement data. Should a plurality of cameras be present, one of the recorded images can be used as an overview image while all images are used to obtain height measurement data. Furthermore, it is possible for the overview image to be calculated from one or more raw images recorded by an overview camera. By way of example, a plurality of laterally offset raw images can be combined to form an overview image (image stitching).

Preferably, the overview image is spatially calibrated relative to the height measurement data. Thus, a field of view of an overview camera can be spatially calibrated relative to components of the overview device which record the height measurement data. As a result, the height measurement data with which a pixel in the overview image is related is known, possibly with knowledge or assumption of a distance between the sample and the overview camera or remaining components of the overview device. This renders it possible to deduce an associated position in the height map from a localization of an identified image region. If height information is obtained with the aid of the context information relating to an identified image region, the height measurement data which should be replaced or altered thereby are consequently known.

In addition or as an alternative thereto, there can also be a calibration between the overview device and the examination device. As a result of this, the relative position of a height map, which is calculated with the aid of the overview device, is known relative to the examination device. This is advantageous, in particular, if the height map is used to set a relative position between the sample and the examination device. Here, the height information of the height map serve to set the distance between the examination device and the sample. Subsequently, the sample can be examined by means of the examination device at the set relative position. Here, the aforementioned height map is created in inventive fashion on the basis of the height measurement data that were supplemented or altered with the aid of the overview image.

Context information, from which height information is obtained, is ascertained for the image regions identified in the overview image. This can be direct/absolute height data, by means of which height measurement data can be replaced or supplemented. By way of example, if an object (for instance, a certain electronic assembly) is identified on a substrate and the height of the electronic assembly and the relative position of the substrate are known, then the height information can directly specify the height. Alternatively, the height information obtained with the aid of the context information can specify relative height information, for example the known height of an identified assembly relative to the unknown height of a substrate. As a further example, relative height information can specify a height of the object of the identified image region relative to an adjacent image region, in particular the fact that an identified mirroring area has the same height as a certain adjacent image region.

The certain image regions identified in the overview image can comprise critical image regions, which are one or more of the following: shadows, mirroring, transparent regions and/or highly absorbing regions. Little measurement light is reflected in the case of highly absorbing regions, and so optical measurements often supply no height measurement data or erroneous height measurement data in respect of these regions. A region whose pixel brightness in the overview image lies below a specified threshold can be defined to be highly absorbing. A critical image region to be identified can also be present if an object below a specified minimum size is identified: In this case, there is a high probability that no reliable height measurement data are captured, and so height information for this critical image region is derived from the overview image and supplemented in the height map.

In preferred variants of the invention, the identification of certain image regions in the overview image can include a localization of these image regions, for example in the form of a list of found object forms or by virtue of a certain value being assigned to each image pixel, with each found object being assigned a different value. As an alternative or in addition thereto, the derivation of context information in relation to localized image regions can include an ascertainment of the type of these image regions. By way of example, ascertaining the type can specify whether, or what type of, critical image region is present, for example a shadow, mirroring or a transparent object. The ascertained type can also be referred to as semantic of the image region.

It may be preferable for supplementing or altering the height measurement data with the aid of the context information to be implemented on the basis of the type of a localized image region. Depending on the type, different rules can be stored in respect of how height information is obtained for this image region; by way of example, shadows, mirroring and transparent regions can each be treated differently. In particular, if an image region is assessed to be of the "shadow" type, the next step can be to identify (by way of an image analysis) which image regions adjacent thereto correspond to a shadow-causing object and which adjacent image regions correspond to a substrate. Height information for the "shadow" type image region can now be derived from the adjacent image regions corresponding to a substrate (and not the shadow-causing object). As an alternative or in addition thereto, height information for the "shadow" type image region can be derived with the aid of height information that is available in respect of the shadow-causing object type. Thus, a shape of the shadow-causing object may be known, from which the height of the shadowed region may be derivable, for example if a protruding electronic assembly casts a shadow and it is known that a component (e.g., a contact pin) associated with this electronic assembly is situated next to the assembly at a point that is in the shadows. In this case, height information of the shadowed region is obtained neither by averaging/extrapolating height measurement data of the shadow-casting object nor by averaging/extrapolating height measurement data of the substrate. Rather, height information is derived from the object type identified.

When an image region is assessed as being of the "mirroring" type, it may be preferable for the height measurement data corresponding to this image region not to be included in the height map. This is based on the assumption that if height measurement data can even be obtained from a mirroring sample region, these will be falsified height measurement data. To the extent that this is possible, context information in relation to this mirroring region or adjacent/surrounding image regions is in addition obtained from the overview image, said context information allowing height data to be supplemented. As already mentioned, the context information can specify, for example, that an object type known in advance has been identified and the mirroring area is level with other parts of the identified object or deviates in a known manner from the height of the other parts of the identified object.

Ideally, information improving the height measurement data is derived from the overview image. Depending on the sample, however, it may be the case that the presence of certain objects is identified but that no height information can be derived for these objects from the overview image. It may be helpful in this case if information about the presence of an object is output and optionally used further in automated fashion. Provision can be made for an initial assessment to be made on the basis of context information or the type of identified image region as to whether height information for this image region is derivable from the overview image. In the case of no height information being derivable, an alert can be output that no height information is derivable for this image region. The alert can either be output to a user, for example by way of a representation on a screen, or be transmitted as a signal to a computing device, in particular in order to carry out further controls in automated fashion, as will be described in more detail below.

By way of example, image analysis methods can search for distortions in the image of a structured object (e.g., a checkerboard pattern) which are characteristic for lenses. If such an image distortion is found, it is possible to deduce the presence of a transparent lens or an optically active element. Possibly, a radius of curvature of the entire object surface can be derived from the distortion.

If an image region is identified as a "transparent object" type and no height information is derivable for this transparent object, the alert can accordingly specify that an object is present but that its height is unknown. Similarly, an alert can be output in the case of a small unidentified object, the small size of which below a specified threshold making it probable that no height measurement data will be obtained in this respect.

A different function of the measuring apparatus can be started or influenced on the basis of the alert. By way of example, this can relate to a safety margin which part of the examination device (e.g., a microscope objective) must maintain with respect to the sample. In the case of a displaceable sample stage, it is specified that it is not possible to drive to any sample stage position that would cause the safety margin to be undershot. A collision with the sample is avoided as a result of the safety margin. By way of example, the safety margin can be increased in the case of an alert (in comparison with the case of no alert), and so a greater safety margin is also chosen when there is a greater uncertainty in respect of the sample height.

If no height information is derivable for an image region and/or if an image region is identified as a "transparent object" type, a safety margin to be observed by the examination device is preferably increased in a sample region corresponding to the aforementioned image region. In this case, there is no global safety margin but a safety margin that is chosen differently depending on the sample region. In the aforementioned case, the safety margin is increased in comparison with the remaining sample regions. What this ensures is that a part of the examination device (e.g., an objective) may be situated very close to the sample in sample regions whose height is known comparatively reliably while a larger safety margin is to be maintained in other sample parts, the height of which is known less reliably or not at all.

The height measurement data can also be assessed according to the locations at which erroneous data are likely, and so height information is subsequently derived in a targeted manner for these locations from the overview image. In this variant, there initially is an assessment of the height measurement data or an assessment of raw data of the height measurement data in respect of where problem regions are present, in particular regions in which an inconsistency of height measurement data, an invalid height value or a signal characteristic/appearance characteristic for mirroring is identified. The already described identification of certain image regions in the overview image now includes an identification of image regions spatially corresponding to the problem regions, in particular an identification of a semantic or an object type by means of image analysis. In this variant, provision can optionally be made for height information to be derived from the overview image and used to supplement the height measurement data only for image regions which spatially correspond to previously ascertained problem regions.

Optionally, the overview image or overview image parts is/are classified, in particular using a trained machine learning algorithm. By way of example, a classification can specify a sample class with a mirroring surface, for instance a printed circuit board or electronics with mirroring components, e.g., capacitor regions or electrical contacts. Thus, in addition to an object type for a certain image region (e.g., capacitor), the larger unit or sample type this relates to is also ascertained. Then, whether height information for a certain image region is ascertainable from other image regions (and, if so, from which image regions) is derived from the classification and the ascertainment of the type of the certain image region. Should this be the case, height information is derived and used for the height map made of the height measurement values.

In one variant of the invention, provision is made for a quality measure to be calculated for each point of the height map in order to identify sources of errors such as noises, reflections, dirtying, an incorrect calibration, etc. The quality measure expresses the level of correspondence between height information derived from context information in relation to an identified object and a height measurement value recorded in this respect.

Checking the plausibility of height measurement data can optionally be carried out as follows: Height information for certain image regions or all image regions are estimated from the overview image. Here, the height information can specify absolute height values, relative height values relative to other sample regions, permissible height value ranges for individual sample regions or a global permissible height value range for all height measurement values. Thereupon, the plausibility of the height measurement data is checked with the aid of the height information from the overview image. If individual height measurement data deviate too strongly from the height information or height values obtained therewith (for example, by more than a given threshold), it is possible to output a signal that these height measurement data are implausible. The information can be indicated to the user, a graphical correction tool can be displayed for the user for manual correction of the height measurement values (with values classed as implausible being marked) or there can be an automatic correction, in particular by means of the height information obtained from the overview image.

The overview image can also be composed by a plurality of partial images or can be formed by a plurality of partial images that are separately available. It is not mandatory for the plurality of partial images to be combined to form an image for the functionality of the invention; rather, these can also be analysed, separately in each case, in the manner described.

The disclosed steps in respect of the overview image, in particular the identification of certain image regions and the derivation of context information, can be implemented with the aid of image processing algorithms. The computing device can comprise corresponding image processing algorithms or can be configured to carry out the latter. The computing device can be formed by a computer situated next to the overview device or, alternatively, at least in part by a remote server or computer. Described method steps can also be carried out by software which is stored in the computing device or a memory connected therewith. The software can comprise machine learning algorithms, in particular deep learning methods (convolutional neural networks) for the image analysis. Respective dedicated machine learning algorithms can also be used for classification, segmentation, and object detection. These can be trained by supervised or unsupervised learning methods. A training data record is annotated in the case of supervised learning methods; by way of example, sample types are classified or critical surfaces are marked. Critical regions can be segmented in the training data and assigned to a type, e.g., mirroring, transparent or strongly absorbing. The specification in respect of the type of image regions or critical regions that should be identified in images can consequently be taught to a machine learning algorithm in a training procedure. An algorithm can also be taught to detect reflection in the overview image or in the calculated height map by way of appropriate training data. In the case of unsupervised learning, an algorithm can be taught using training data (measurement data or simulated data) showing expediently reflective sample regions. Subsequently, mirroring or transparent regions (not contained in the training data) supply a non-typical result, from which the taught algorithm can deduce the presence of a critical region.

Descriptions for image regions, for example an ascertainment of type of identified image regions, should be understood to mean that these apply to at least some of the image regions (and optionally to all image regions). If there is an ascertainment of type for identified image regions, this can accordingly mean that the type of at least one of the image regions is ascertained while there can also be other image regions for which no type is ascertained or no type can be ascertained.

The properties described as additional features of the measuring apparatus also yield variants of the method according to the invention when used as intended. Conversely, the measuring apparatus, in particular the computing device thereof, can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Exemplary Embodiment of a Measuring Apparatus

Figure 1:
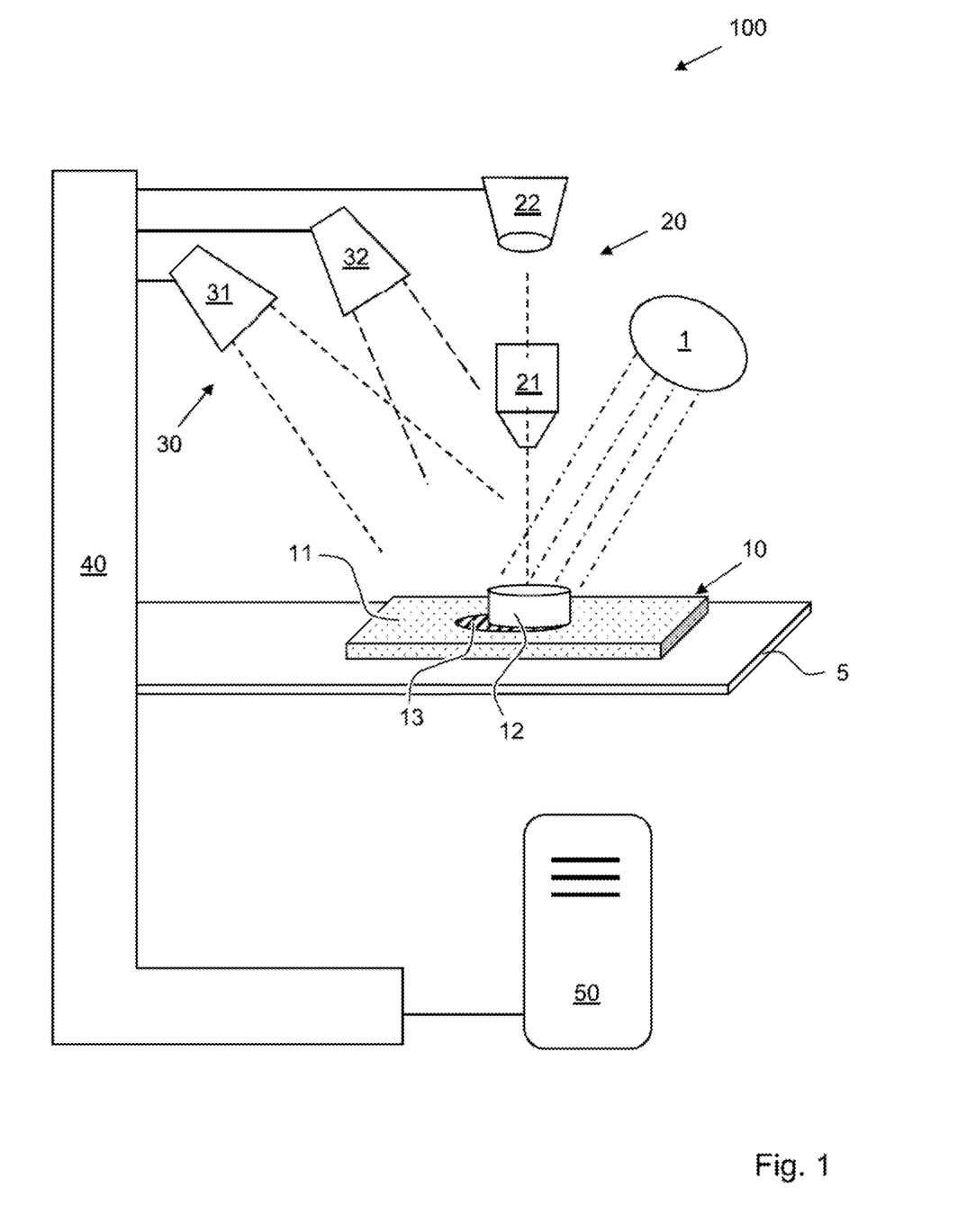
FIG. 1 shows a schematic illustration of an exemplary embodiment of a measuring apparatus of the invention.

FIG. 1 shows an exemplary embodiment of a measuring apparatus 100 according to the invention which is designed as a microscope in this case and which comprises an overview device 30.

The overview device 30 should measure the height of a sample 10 in order to determine a height map of said sample 10. A height map should be understood to mean that a respective height value is captured for different laterally offset surface regions of the sample 10. A corresponding data record is referred to as a height map, with a graphical illustration of the height map being optional.

The measuring apparatus 100 comprises an examination device 20, which comprises an objective 21 and a camera 22 and which can also comprise further optical components. The objective 21 is arranged in such a way that it guides light coming from the sample 10 (detection light) to the camera 22.

The overview device 30 comprises at least one camera 31, 32. At least one of the cameras 31, 32 serves to record an overview image of the sample 10 and can be referred to, accordingly, as an overview camera. Fields of view of the two cameras 31, 32 are illustrated using dashed lines.

The measuring apparatus 100 comprises a light source 1 in order to illuminate the sample 10. In particular, illumination light can be visible light, IR light, UV light or else other electromagnetic radiation from other spectral regions. In the illustrated example, detection light emanates from the sample 10 on account of the illumination light, some of said detection light being registered by the overview device 30. In particular, the detection light can be or comprise scattered or reflected illumination light, ambient light that has been scattered or reflected at the sample 10 and/or, in principle, also fluorescent light.

In the illustrated example, the two cameras 31, 32 record images of the sample 10 from different viewing directions. By combining the images of the two cameras 31, 32 by calculation, it is possible, in a manner known per se, to obtain height information (height measurement data). In particular, raw height measurement data can be considered to be the recorded images or information derived therefrom, as described in more detail below.

In this case, the sample 10 is held by a displaceable sample stage 5. Moreover, the measuring apparatus 100 comprises a stand 40, by means of which components of the measuring apparatus 100 are held.

A computing device 50 of the measuring apparatus 100 serves to process the measurement data of the cameras 31, 32 and, optionally, also to control components of the measuring apparatus 100, in particular the light source 1, the camera 22, the cameras 31, 32, and the sample stage 5.

A relative position between the sample 10 and the examination device 20 can be set with the aid of a height map of the sample 10, which is obtained by way of the overview device 30. In particular, a height of the sample stage 5 can be set on the basis of the height map in such a way that a distance from the objective 21, which is desired for the examination, is present and that, moreover, a collision between the objective 21 and the sample 10 is avoided.

Here, purely by way of example, the sample 10 comprises a polished sample, in which a cylindrical object is embedded in resin and protrudes from said resin. In general, it is possible to measure any sample 10 with an unknown height profile. The sample 10 comprises a substrate 11 and an object 12 protruding therefrom in a height direction. The protruding object 12 casts a shadow 13 on part of the substrate 11, which is why the object 12 is also referred to as a shadow-causing object 12. To clarify matters, the shadow 13 can thus refer to part of the sample 10 on which less illumination light is incident on account of the height profile of the sample. The sample 10 can also comprise mirroring regions, in particular as a result of a grinding or polishing of the sample surface. In this respect, a mirroring region can be understood to mean a section of the sample 10 which reflects illumination light to one of the cameras when recording an overview image or height measurement data. Therefore, different sections of the sample can represent mirroring regions within this meaning depending on the measurement situation, e.g., illumination angle or sample stage position.

Further Exemplary Embodiments of a Measuring Apparatus

Figure 2:
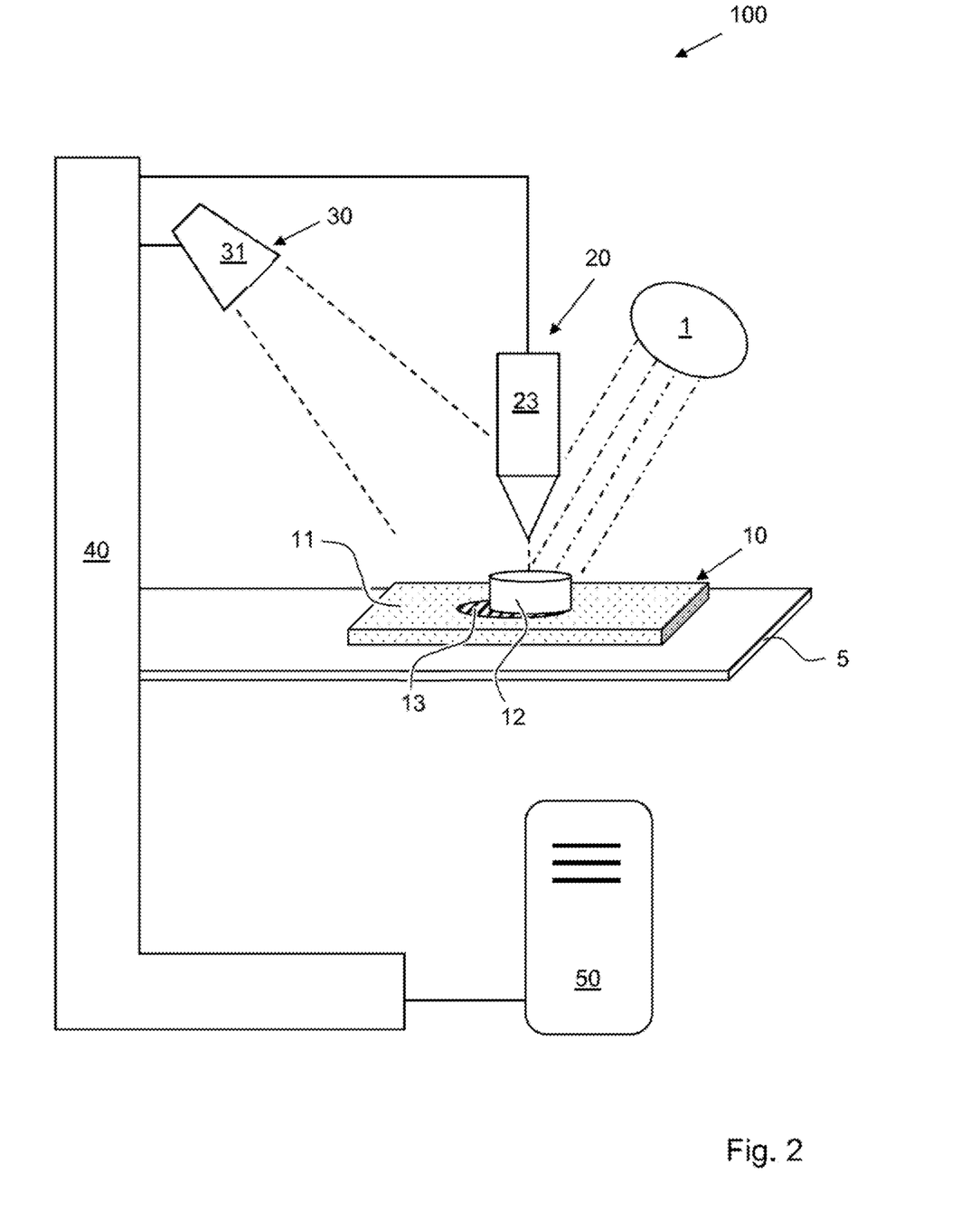
FIG. 2 shows a schematic illustration of a further exemplary embodiment of a measuring apparatus of the invention.

FIG. 2 shows a further exemplary embodiment of a measuring apparatus 100 of the invention. Here, a measuring head 23 operating on tactile principles is used as an examination device 20.

The overview device 30 comprises only a single camera 31. The illumination by the light source 1 is used only for recording the image with the overview device 30. By way of example, if a patterned or stripe illumination is used, a single camera 31 can suffice for the purposes of recording raw height measurement data. At the same time, the same camera 31 can also record an overview image of the sample 10. The overview image and the raw height measurement data can be recorded in succession (for the purposes of which the light source 1 can optionally generate different types of illumination, for example with and without a pattern). However, alternatively, the same raw data or some of the same raw data of the camera 31 can be used to form the overview image and the height measurement data. By way of example, a plurality of images with different stripe illumination can be combined to form an overview image. Alternatively, a plurality of images with different focal lengths can also be recorded. The image in which a sample region appears in focus then depends on the height profile of the sample 10, and so height measurement data can be obtained in this fashion. Moreover, one of the images can be used as an overview image or, alternatively, the plurality of images can be added or combined by calculation in another way to form an overview image.

As an alternative to the illumination of the sample 10, ambient light may also be sufficient so that the light source 1 for recording an image with the overview device 30 can also be dispensed with.

Whether a sample stage 5 is used may depend on the type of sample. By way of example, if the sample is a product in a production line, the sample stage can be dispensed with.

In further developments of FIG. 1, the measurement data of the camera 22 can also be used to form the overview image and/or the height measurement data or raw height measurement data. In this case, the camera 22 can be part of the overview device 30 if the objective 21 is not situated in the beam path or if a different objective is situated in the beam path, the imaging scale of which is smaller than that of the objective 21. In this design, the cameras 31 and/or 32 can be dispensed with or be part of the overview device 30 in addition to the camera 22. Once again, the height measurement data and the overview image can be recorded simultaneously or in succession. In order to change between recording height measurement data and an overview image using the same camera 22, it is possible, for example, to change a microscopy mode (e.g., between a wide-field image recording and a chromatic-confocal image recording) and/or it is possible to change between objectives with different imaging scales. In further developments of the illustrated examples, one or more of the cameras 22, 31, and 32 can be replaced by a light detector or a stripe detector. Point or stripe detectors can be suitable for recording raw height measurement data and/or can be suitable for recording an overview image, in particular if different sample points are scanned in succession by a scan.

Depending on the measurement principle, the illumination light of the light source 1 can also be guided onto the sample 10 via the objective 21 or another objective used.

The exemplary embodiments illustrated in FIGS. 1 and 2 and the variants described in that respect can also be mixed; by way of example, the tactile measuring head 23 can be replaced by the objective 21 with the downstream camera 22, or vice versa.

Exemplary Image Processing and Formation of a Height Map

Figure 3A:
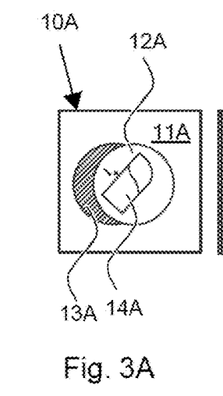
FIG. 3A shows an overview image of a sample.

FIG. 3A shows an overview image 10A, recorded of the sample 10, using the overview device 30. The overview image 10A contains an image region 11A of the substrate 11 of the sample, an image region 12A of the shadow-causing object 12, an image region 13A, which shows a shadow 13 caused by the shadow-causing object 12, and an image region 14A, which represents mirroring by a reflecting region of the sample. The image processing, according to the invention, of such an overview image 10A is described in more detail below.

Figure 3B:
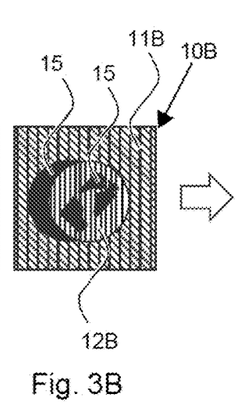
FIG. 3B shows a height map of the sample.

Initially, a height map 10B, which is generated by height measurement data of the overview device 30, is described with reference to FIG. 3B. Depending on the measurement principle, the overview device 30 can either record the height measurement data directly or initially record raw data, from which the height measurement data are obtained. In FIG. 3B, the diagonal hatching denotes a height value or a region of a certain height. The diagonally hatched region 11B, which corresponds to the substrate 11 of the sample 10, was consequently captured in plane form and has a common height value. The region 12B without diagonal hatching corresponds to a different height value and represents the protruding, shadow-generating object 12. The black regions 15 denote regions for which no, or no usable, height measurement data are available. These regions 15 correspond to the shadow 13 on the sample 10 and a reflecting section of the sample. In particular, no (usable) height measurement data can be obtained in the case of a shadow if the height measurement is based on the principle of a patterned illumination, wherein a pattern (for example stripes) is radiated onto the sample surface. Height measurement data can be obtained from the position and/or distortion of the pattern (e.g., the stripes). However, no pattern can be radiated into the region of the shadow, and so no height measurement data are obtained here. Nor is detection light permitting a reliable ascertainment of height measurement data obtained from the reflecting section of the sample either in the case of the patterned illumination example. Moreover, vertical black stripes are superposed in the example of FIG. 3B; no height values are available therein on account of the measurement principle. In the case of striped illumination, this can originate for example from non-illuminated sample portions.

Now, the computing device 50 of FIG. 1 or 2 carries out image analysis steps in order to obtain information from the overview image of FIG. 3A which is intended to improve the height map of FIG. 3B.

Figure 3C:
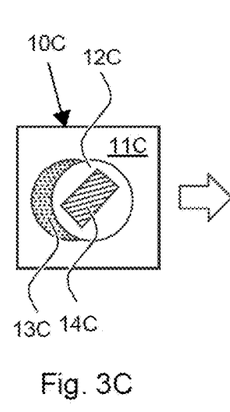
FIG. 3C shows an image processing result for the overview image of FIG. 3A.

A result of these image analysis steps is shown in FIG. 3C. For the purposes of this image analysis result 10C, certain regions were identified in the overview image 10A of FIG. 3A. To this end, image analysis algorithms can recognize and localize certain shapes or learned objects in the overview image 10A. In this example, the image region 13A was identified as a shadow 13C. This should be understood to mean that, firstly, the limits of this image region were identified and, secondly, a semantic was assigned to the image region, i.e., a specification relating to the type of image region. Furthermore, the image region 14A was identified as a reflecting/mirroring region.

An image analysis algorithm can also classify the overview image 10A, in order to categorize the type of sample. Here, conventional sample types can be learned, for example polished samples, in which, typically, a cylindrical or at least regularly shaped object protrudes from a plane substrate. Further image information from the overview image can also be used for this type of classification, for example writing on the sample (not illustrated). A classification can also be carried out without image analysis or can be specified by a user. As a result of the classification, it may be known that a polished sample or an object 12 protruding from a substrate 11 is present. Using this classification, in particular, the image region 11A can be identified as a plane substrate 11C and the image region 12A can be identified as a region 12C of the protruding object 12. It may be known or derived from the overview image 10A by way of an image analysis that a surface of the protruding object 12 is plane; i.e., the mirroring region 14C forms part of this surface and has the same height as the surface of the object 12. Consequently, context information is obtained for an identified image region 13A, 14A, allowing deductions about height information.

In the case of the shadow, context information could comprise, e.g., one or more of the following information items: classifying the image region 13C as a shadow; identifying a region 12C adjoining the image region 13C as a shadow-causing object; classifying that the image region 13C of the shadow has a lower height value than a height value of the shadow-causing object; identifying an image region 11C, which adjoins the image region 13C and which does not represent the shadow-causing object, as a substrate, from which height values for the image region 13C can be derived. Height information for the image region 13C of the shadow that can be derived from this context information is for example that height values for this image region 13C should be the same as a height measurement value of the substrate or should be ascertained by interpolation/extrapolation from height measurement values relating to the substrate.

In the case of the reflecting section 14C, the context information can specify, for example, that this is part of the surface of the object 12C and height values for the reflecting section 14C should be derived from height measurement values for the object 12 (e.g., by averaging these height measurement values or by equating these to a height measurement value of the object 12).

Figure 3D:
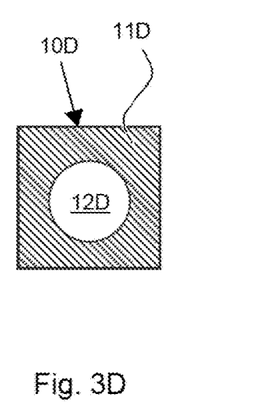
FIG. 3D shows the height map of FIG. 3B after altering or supplementing height values.

A modified height map 10D is formed from the height map of FIG. 3B with the aid of this context information; it is shown in FIG. 3D. The height measurement values which were missing in the region of the shadow were filled, by means of which a height region 11D of uniform height is formed. Moreover, height values for the reflecting region were supplemented or altered such that an upper side of the shadow-causing object forms a common height region 12D in the height map 10D.

Other image artefacts, too, such as the vertical stripes in FIG. 3B, could be eliminated by context information. By way of example, the discovery that the image region 11C represents a plane substrate allows the vertical stripes to be filled with height measurement values which were recorded for the same image region 11C. The output height map 10D is consequently more precise than the height map 10B consisting only of the height measurement values.

Further Exemplary Image Processing and Formation of a Height Map

Figure 4A:
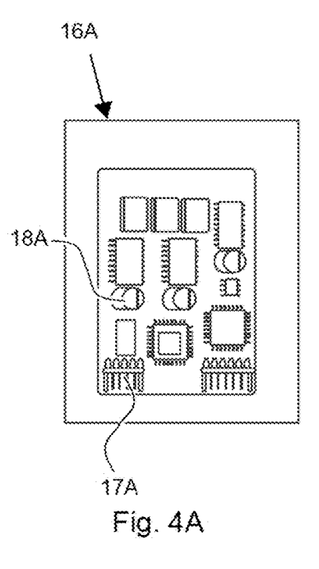
FIG. 4A shows an overview image of a sample.

A further example is described with reference to FIGS. 4A-4C. FIG. 4A shows an overview image 16A of a sample, which is a circuit board. The circuit board comprises various circuit board components, e.g., plug connectors, capacitors, conductor tracks, and integrated circuits. In the overview image 16A, an image region of a capacitor 18A and an image region of a plug connector 17A have been provided with reference signs in exemplary fashion.

Figure 4B:
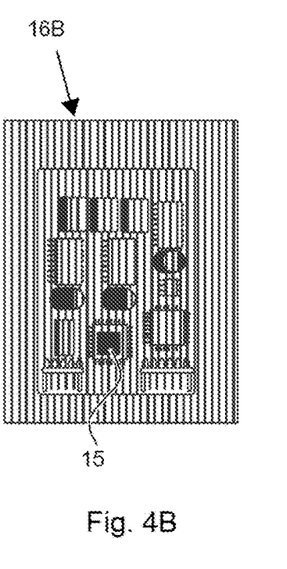
FIG. 4B shows a height map of the sample.

FIG. 4B shows a height map formed from recorded height measurement data. Vertical stripes once again specify regions in which height measurement data are missing. Moreover, the protruding capacitors cast shadows in which it has not been possible to ascertain height measurement data. Reflections at various metallic surfaces moreover likewise lead to missing height measurement values.

Figure 4C:
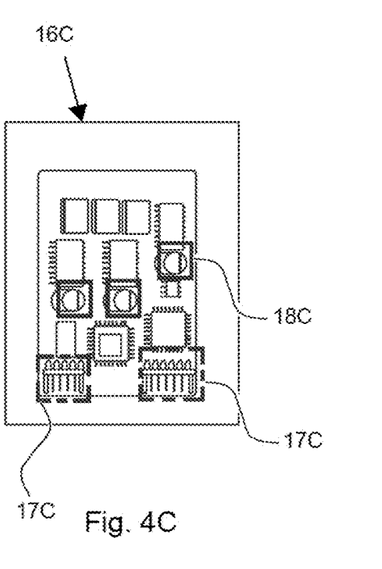
FIG. 4C shows an image processing result for the overview image of FIG. 4A.

Now, certain image regions are identified in the overview image 16A of FIG. 4A and a calculated image processing result 16C is shown schematically in FIG. 4C. The image regions of a plurality of identified capacitors 18C are framed in this case. Moreover, a plurality of plug connectors were identified and the corresponding image regions 17C were marked. Context information for the image regions of the capacitors 18C can be used, like in the preceding example for the shadow-causing object. Moreover, the knowledge that the plurality of identified capacitors have the same shapes can be used. As a result, missing or erroneous height measurement values on one of the capacitors can be supplemented by available height measurement values at another one of the capacitors. Depending on the illumination, the region adjoining to the left might be shadowed for example in the case of a first capacitor while the region adjoining to the left is not shadowed in the case of a second capacitor. For the shadowed region at the first capacitor, height measurement values can then be supplemented from the non-shadowed region at the second capacitor. These supplemented height measurement values can differ significantly from a simple interpolation/averaging of adjacent height measurement values: By way of example, depending on printed circuit board design, certain connectors or lines might extend next to a capacitor, the height profile of which has not been shadowed at the second capacitor and therefore could be measured—these height measurement values of the connectors or lines can now be supplemented next to the first capacitor.

By way of example, in the case of the plug connectors 17C, the knowledge of a periodic structure of a plug connector, e.g., the latter being made of a plurality of similar contact faces, can be used as context information. If there was mirroring at one of these contact faces, as a result of which no usable height measurement values are available, height measurement values from other contact faces can be supplemented. In this way, it is possible, in turn, to alter and correct the height map 16B from FIG. 4B. Expressed more generally, similar objects can be identified in the overview image and height measurement values in respect of one of the objects can then be supplemented in the case of another one of the similar objects.

Exemplary Method Procedure

Figure 5:
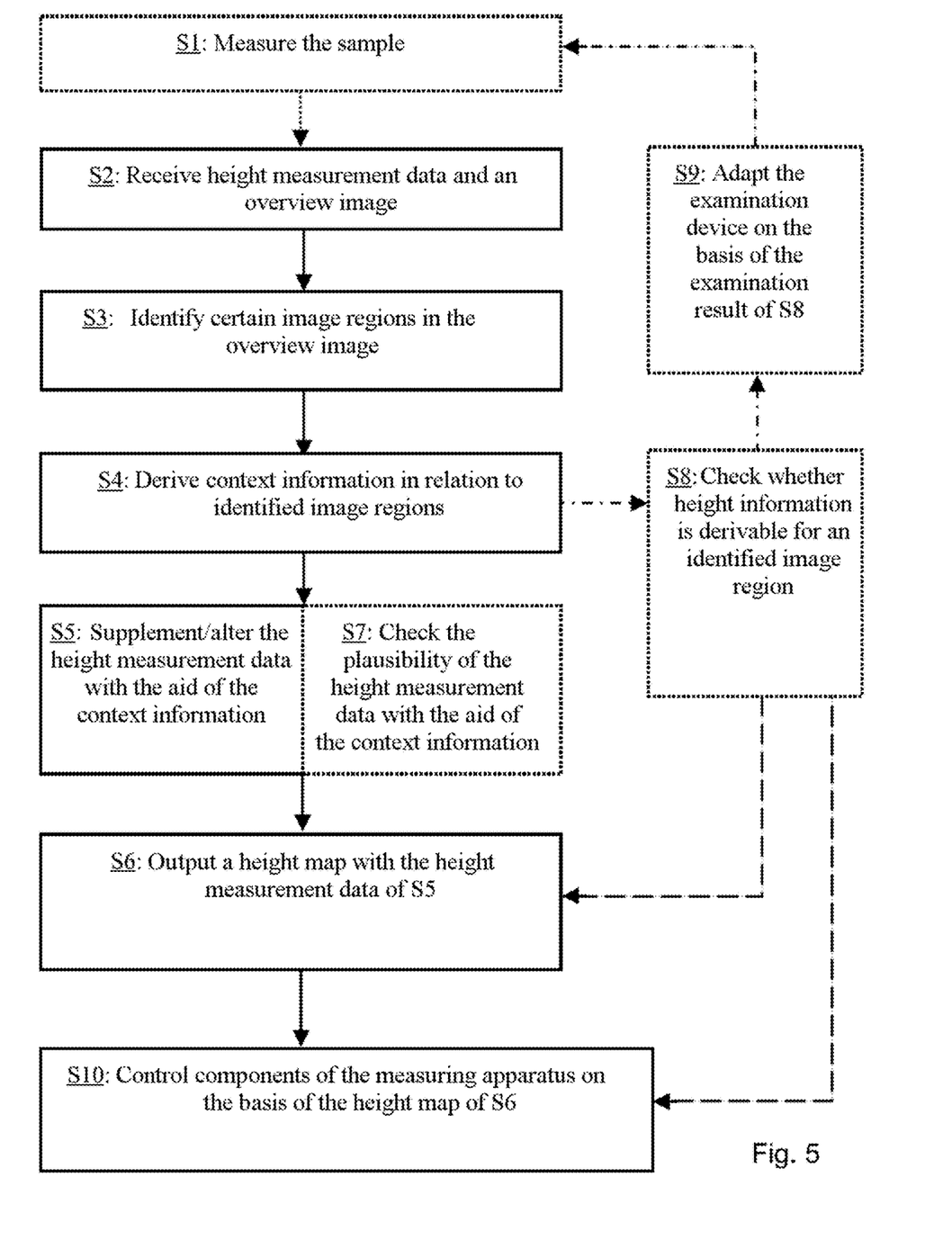
FIG. 5 shows a flowchart for explaining a method according to the invention.

The steps of an exemplary method of the invention are explained below with reference to the flowchart of FIG. 5. These steps can be carried out or caused by the computing device 50 of the aforementioned exemplary embodiments.

In step S1, a measurement is carried out on the sample, within the scope of which raw height measurement data are recorded. Height measurement data which each specify a height value for various lateral regions of the sample surface are calculated from the raw height measurement data. Depending on the measurement principle, an overview image is also calculated from the raw height measurement data or an overview image is recorded by way of a dedicated overview measurement.

In step S2, the height measurement data and the overview image of S1 are obtained. Variants of the method according to the invention can also resort to previously recorded measurement data, as a result of which step S1 need not necessarily be part of the method of the invention but represents an optional extension.

An image analysis of the overview image for identifying certain image regions is carried out in step S3, which follows S2. "Certain image regions" can be understood to mean specified types of image regions, for example shadows, mirroring and/or certain objects such as biological cells or cell components, rock samples, electronic components, manufacturing components or sample vessel parts such as coverslips or microtiter plate sections.

In step S4, context information is derived for the identified image regions, for example in respect of the type of the respective image region and/or how a height of the sample section of one image region is linked to a height of a sample section of another image region.

The height measurement data are supplemented or altered in step S5 with the aid of this context information. These supplemented or altered height measurement data are finally output in step S6 as a height map. This can comprise a graphical representation for a user and/or an output as an image file or a 3D model, as a result of which further automated analysis or control steps can also follow.

Components of the measuring apparatus can be controlled in step S10 with the aid of the height map of S6. By way of example, a distance between the sample and a part of the examination device or the overview device can be set on the basis of the height map.

In an optional design, the method is extended by an additional method step S7, which is parallel with, before or after step S5. In step S7, the plausibility of the height measurement data is checked on the basis of the context information or other information derived from the overview image. By way of example, an upper and lower limit for height values can be derived from the overview image. If a height measurement value is outside these limits, it can, in particular, be deleted, be pushed to the limit or be marked for further processing by a user.

Optionally, step S8 can also be supplemented. In the latter, a check is carried out as to whether, although the presence of an object has been determined in the overview image, no context information usable for supplementing or altering the height measurement data could be derived. By way of example, this may be the case in some transparent objects, in particular in the case of lenses. Consequently, the fact that the sample comprises a transparent object is identified in the overview image and the relative position of the transparent object is also ascertained, but height information for the transparent object cannot be derived from the overview image. In the case of a further example, objects are present that are smaller than a minimum size that is necessary for height measurement data to be able to be ascertained (reliably) for this object. In this example, the presence of such a small object is determined, with the height thereof remaining unknown.

Objects of an unknown height identified in step S8 can be marked in the height map of S6, for example for acknowledgement or further processing by a user. As an alternative or in addition thereto, the measuring apparatus control of step S10 can also be implemented on the basis of whether height information is derivable in S8. Thus, step S10 can optionally include a local or global safety margin being set. A measuring apparatus component, in particular an objective or another part of the examination device 30, must not come closer to the sample than said safety margin so as to keep the risk of a collision low. Here, a local safety margin specifies that a different (greater) safety margin should be maintained in the region of the identified object of unknown height than in remaining sample sections, for which height measurement values could be recorded and optionally could be verified by the overview image.

Optionally, step S9 can also follow step S8, in which settings that influence the examination device are altered. Subsequently, height measurement data once again recorded in step S1 with the altered settings. The altered settings depend on whether, or with respect to which image regions or identified objects, no height information could be obtained. By way of example, the corresponding sample regions can be examined again with an altered illumination setting (intensity, spectral range, polarization, illumination pattern, etc.), altered detection setting (in particular, altered measurement duration, altered height measurement region, colour filter or colour selection) or altered sample positioning (sample stage position).

The repeated examination of a sample region with altered measuring apparatus settings (S9 and S1) can optionally also follow step S7. Here, the sample regions for which the plausibility check has yielded a negative result are examined again.

What the variants of the invention achieve is that a height map of a sample can be created particularly precisely and reliably, which can be to the benefit of, for example, a movement of measuring apparatus components on the basis of this height map.

LIST OF REFERENCE SIGNS

1 Light source
5 Sample stage
10 Sample
10A Overview image
10B Height map obtained from height measurement data of the overview device only
10C Image analysis result from the overview image 10A with identified image regions
10D Height map calculated from the height map 10B with the aid of the overview image 10A
11 Substrate
11A Image region of a substrate
11B Height region of the height map 10B
11C Image region of a substrate identified from the overview image 10A
11D Height region of the height map 10D
12 Shadow-causing object
12A Image region of a shadow-causing object
12B Height region of the height map 10B
12C Image region of a shadow-causing object identified from the overview image 10A
12D Height region of the height map 10D
13 Shadow
13A Image region of a shadow
13C Image region of a shadow identified from the overview image 10A
14A Image region of a mirroring object region
14C Image region of a mirroring object region identified from the overview image 10A
15 Regions in which the height map 10B contains no height value
16A Overview image
16B Height map obtained from height measurement data of the overview device only
16C Image analysis result from the overview image 16A with identified image regions
17A Image region of a plug connector
17C Image region of a plug connector identified from the overview image 16A
18A Image region of a capacitor
18C Image region of a capacitor identified from the overview image 16A
20 Examination device
21 Objective of the examination device 20
22 Camera of the examination device 20

23 Tactile measuring head of the examination device 20
30 Overview device
31 (Overview) camera of the overview device 30
32 (Overview) camera of the overview device 30
40 Stand
50 Computing device
100 Measuring apparatus, in particular microscope
S1-S10 Steps of the method

We claim:

1. A measuring apparatus for examining a sample, the apparatus comprising:
an overview device which is configured to record raw height measurement data of the sample and generate an overview image of the sample;
an examination device for examining the sample; and
a computing device for calculating height measurement data from the raw height measurement data;
wherein the computing device is configured to:
identify certain image regions in the overview image, comprising localizing said image regions;
derive context information in relation to identified image regions,
comprising ascertaining a type of the identified image regions; and
supplement or alter the height measurement data with the aid of the context information.

2. The apparatus of claim 1,
wherein the certain image regions, which are identified in the overview image,
comprise critical image regions, which are one or more of the following: shadows, mirroring, transparent regions, or highly absorbing regions defined as regions whose pixel brightness in the overview image lies below a specified threshold.

3. The apparatus of claim 1,
wherein the computing device is further configured to assess the height measurement data or the raw height measurement data in respect of where problem regions are present, wherein the problem regions are regions in which an inconsistency of height measurement data, an invalid height value or an appearance characteristic for mirroring is identified,
wherein the identifying of certain image regions in the overview image comprises identifying of image regions in the overview image spatially corresponding to the problem regions.

4. A method for determining a height map of a sample, the method including:
receiving height measurement data of the sample;
receiving an overview image of the sample;
identifying certain image regions in the overview image;
deriving context information in relation to identified image regions; and
supplementing or altering the height measurement data with the aid of the context information,
wherein the certain image regions, which are identified in the overview image,
comprise critical image regions, which are one or more of the following: shadows, mirroring, transparent regions, or highly absorbing regions defined as regions whose pixel brightness in the overview image lies below a specified threshold.

5. The method of claim 2,
further comprising:
recording the height measurement data or raw height measurement data, from which the height measurement data are obtained, using an overview device; and
recording the overview image with a camera of the overview device.

6. The method of claim 2,
further comprising
forming the overview image from the height measurement data or from raw height measurement data, from which also the height measurement data are obtained.

7. The method of claim 2,
wherein the identifying of certain image regions in the overview image comprises a localization of said image regions and
wherein the deriving of context information in relation to localized image regions comprises an ascertainment of a type of these image regions.

8. The method of claim 2,
further comprising
calculating the height measurement data from raw height measurement data of the sample.

9. The method of claim 8,
further comprising
assessing the height measurement data or the raw height measurement data in respect of where problem regions are present, wherein the problem regions are regions in which an inconsistency of height measurement data, an invalid height value or an appearance characteristic for mirroring is identified,
wherein the identifying of certain image regions in the overview image comprises identifying of image regions in the overview image spatially corresponding to the problem regions.

10. A method for determining a height map of a sample, the method including:
receiving height measurement data of the sample;
receiving an overview image of the sample;
identifying certain image regions in the overview image;
deriving context information in relation to identified image regions; and
supplementing or altering the height measurement data with the aid of the context information;
wherein the identifying of certain image regions in the overview image comprises a localization of said image regions and
wherein the deriving of context information in relation to localized image regions comprises an ascertainment of a type of these image regions.

11. The method of claim 10,
wherein the height measurement data are supplemented or altered with the aid of the context information in dependence of the type of a localized image region.

12. The method of claim 11,
further comprising
if an image region is assessed as a "shadow" type:
identifying which adjacent image regions correspond to a shadow-causing object and which adjacent image regions correspond to a substrate, and
at least one of:
deriving height information for the "shadow" type image region from the adjacent image regions which correspond to the substrate and
deriving height information for the "shadow" type image region on the basis of the height information available in relation to the type of shadow-causing object.

13. The method of claim 11,
wherein, if an image region is assessed as a "mirroring" type, the height measurement data corresponding to this image region are not included in the height map.

14. The method of claim 10,
further comprising
assessing, on the basis of context information of an identified image region,
whether height information for this image region is derivable from the overview image;
and should no height information be derivable according to the assessment:
outputting an alert that no height information is derivable for this image region.

15. The method of claim 14,
wherein, if an image region is identified as a "transparent object" type and no height information is derivable for this transparent object, the alert specifies that an object is present but that its height is unknown.

16. The method of claim 14,
wherein, if no height information is derivable for an image region or if an image region is identified as a "transparent object" type, a safety margin which the examination device must observe is increased in a sample region corresponding to the aforementioned image region.

17. A method for determining a height map of a sample, the method including:
receiving height measurement data of the sample;
receiving an overview image of the sample;
identifying certain image regions in the overview image;
deriving context information in relation to identified image regions;
supplementing or altering the height measurement data with the aid of the context information; and
assessing the height measurement data or raw height measurement data of the sample in respect of where problem regions are present, wherein the problem regions are regions in which an inconsistency of height measurement data, an invalid height value or an appearance characteristic for mirroring is identified,
wherein the identifying of certain image regions in the overview image comprises identifying of image regions in the overview image spatially corresponding to the problem regions.

18. The method of claim 17,
further comprising:
estimating height information from the overview image; and
checking the plausibility of the height measurement data with the aid of the height information from the overview image.

19. The method of claim 17,
further comprising:
creating a height map on the basis of the supplemented or altered height measurement data;
setting a relative position between the sample and an examination device taking the height map into account; and
examining the sample by means of the examination device at the set relative position.

20. The method of claim 17,
wherein the identifying of certain image regions in the overview image comprises a localization of said image regions and
wherein the deriving of context information in relation to localized image regions comprises an ascertainment of a type of these image regions.

* * * * *

UNITED STATES PATENT AND TRADEMARK OFFICE
CERTIFICATE OF CORRECTION

PATENT NO. : 11,168,976 B2
APPLICATION NO. : 16/951612
DATED : November 9, 2021
INVENTOR(S) : Manuel Amthor, Daniel Haase and Dominik Stehr It is certified that error appears in the above-identified patent and that said Letters Patent is hereby corrected as shown below:

On the Title Page

Item (73), Assignee, "Carl Zeiss Microscopy GMBH" should read "Carl Zeiss Microscopy GmbH".

In the Claims

At Column 17, Line 63, Claim 5, "of claim 2," should read "of claim 4,".

At Column 18, Line 3, Claim 6, "of claim 2," should read "of claim 4,".

At Column 18, Line 8, Claim 7, "of claim 2," should read "of claim 4,".

At Column 18, Line 15, Claim 8, "of claim 2," should read "of claim 4,".

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*